(12) United States Patent
Noh et al.

(10) Patent No.: US 9,124,734 B2
(45) Date of Patent: Sep. 1, 2015

(54) MOUSE HAVING SCANNING FUNCTION

(71) Applicant: LG ELECTRONICS, INC., Seoul (KR)

(72) Inventors: Boram Noh, Seoul (KR); Jungyong Lee, Seoul (KR); Minwoo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/322,433

(22) Filed: Jul. 2, 2014

(65) Prior Publication Data
US 2015/0009543 A1 Jan. 8, 2015

(30) Foreign Application Priority Data

Jul. 5, 2013 (KR) .................. 10-2013-0079133
Nov. 12, 2013 (KR) .................. 10-2013-0136760

(51) Int. Cl.
| | | |
|---|---|---|
| *H04N 1/04* | (2006.01) | |
| *H04N 1/00* | (2006.01) | |
| *G06F 3/0354* | (2013.01) | |
| *H04N 1/028* | (2006.01) | |

(52) U.S. Cl.
CPC ........ *H04N 1/00246* (2013.01); *G06F 3/03543* (2013.01); *H04N 1/00347* (2013.01); *H04N 1/0283* (2013.01); *H04N 2201/0096* (2013.01)

(58) Field of Classification Search
CPC ............. G06F 3/03543; G06F 3/0483; G06F 3/04883; G06F 9/48; G06F 9/50; G06K 9/00; G06K 7/10118; G06K 7/10366; G06K 9/00013; G06K 9/20; G06K 9/3283; G06K 9/4604; H04N 1/107; H04N 2201/0081
USPC ........ 358/474, 473, 1.15, 488, 497, 1.18, 1.5, 358/1.8, 296, 448, 450, 1.13, 1.4, 1.6, 3.26, 358/3.27, 3.28, 3.29, 461, 462, 463, 471, 358/475, 478, 505, 540; 382/321, 313, 305, 382/100, 103, 294, 112, 167, 173, 182, 202, 382/229, 242, 260, 274, 275, 284, 310; 235/462.1
See application file for complete search history.

(56) References Cited

U.S. PATENT DOCUMENTS

| | | | | |
|---|---|---|---|---|
| 3,774,014 A | * | 11/1973 | Berler ...................... | 235/462.11 |
| 4,864,946 A | * | 9/1989 | Watkins .................... | 112/80.73 |
| 5,436,655 A | * | 7/1995 | Hiyama et al. ............. | 348/45 |
| 6,844,871 B1 | * | 1/2005 | Hinckley et al. ........... | 345/163 |

(Continued)

FOREIGN PATENT DOCUMENTS

| | | |
|---|---|---|
| CN | 102710885 A | 10/2012 |
| CN | 102710886 A | 10/2012 |

(Continued)

OTHER PUBLICATIONS

European Search Report dated Jan. 7, 2015 issued in Application No. 14175563.7.

*Primary Examiner* — Negussie Worku
(74) *Attorney, Agent, or Firm* — KED & Associates LLP

(57) ABSTRACT

A mouse having a scanning function is provided. The mouse may include a case, a cover, a scan button, and a scanner. The scanner may include a housing, a glass module, a mirror module, a camera module, a lighting module provided in the housing, spaced apart from the camera module, and a barrier provided in the housing, at a position corresponding to a front side of the lighting module, to block light reflected from an inside of the housing.

21 Claims, 10 Drawing Sheets

(56) References Cited

U.S. PATENT DOCUMENTS

| | | | |
|---|---|---|---|
| 7,209,116 B2 * | 4/2007 | Gates et al. | 345/156 |
| 8,189,965 B2 * | 5/2012 | Edgar et al. | 382/313 |
| 8,339,467 B2 * | 12/2012 | Zahnert et al. | 348/218.1 |
| 8,441,696 B2 * | 5/2013 | Zahnert et al. | 358/473 |
| 8,497,840 B2 * | 7/2013 | Zahnert et al. | 345/166 |
| 8,526,069 B2 * | 9/2013 | Kien | 358/474 |
| 8,558,820 B2 * | 10/2013 | Chang | 345/184 |
| 8,576,171 B2 * | 11/2013 | Grant | 345/163 |
| 8,582,182 B2 * | 11/2013 | Zahnert et al. | 358/473 |
| 8,723,885 B2 * | 5/2014 | Zahnert et al. | 345/629 |

FOREIGN PATENT DOCUMENTS

| | | |
|---|---|---|
| CN | 203167095 U | 8/2013 |
| EP | 2 538 654 A1 | 12/2012 |

\* cited by examiner

MOUSE HAVING SCANNING FUNCTION

CROSS-REFERENCE TO RELATED APPLICATION(S)

This application claims priority under 35 U.S.C. §119 to Korean Application No. 10-2013-0079133 filed on Jul. 5, 2013, and Korean Application No. 10-2013-0136760 filed on Nov. 12, 2013, which are both incorporated herein by reference in their entirety.

BACKGROUND

1. Field

This relates to a mouse having a scanning function.

2. Background

A mouse may be a computer input device that performs functions, for example, program selecting, loading, operating, stopping, and window opening/closing, through a clicking operation.

BRIEF DESCRIPTION OF THE DRAWINGS

The embodiments will be described in detail with reference to the following drawings in which like reference numerals refer to like elements wherein.

DETAILED DESCRIPTION

In the following detailed description, reference is made to the accompanying drawings that form a part hereof, and in which is shown by way of illustration various embodiments as broadly described herein. These embodiments are described in sufficient detail to enable those skilled in the art, and it is understood that other embodiments may be utilized and that logical structural, mechanical, electrical, and chemical changes may be made without departing from the spirit or scope as broadly described herein. To avoid detail not necessary to enable those skilled in the art, the description may omit certain information known to those skilled in the art. The following detailed description is, therefore, not to be taken in a limiting sense.

A convergence mouse having a scanning function may perform a scanning operation by manually moving the mouse, and thus such a mouse may also be referred to as a handheld scanner. Such a mouse having a scanning function may provide enhanced functionality, such as, for example, recognizing an image, such as a barcode and the like. In this type of mouse, a camera may capture an image of a scanning region from a single direction, such as an upper direction, in a straight line, thus requiring that the camera be positioned at a particular height for appropriate focusing, increasing an overall height and size of the mouse.

Further, since, in this type of mouse, a light source is positioned just next to the camera, a ghost phenomenon may occur, in which light emitted from the light source collides with a scanning region, is reflected, and is projected into the camera to generate a dim light shadow. Additionally, since the light source is positioned just above a scan window, light emitted from the light source is not laterally diffused, but rather, is focused at a center of the light source, so that a hot spot phenomenon may occur. That is, since light emitted by the light source is not uniformly diffused, non-uniform luminance, in which an edge of a scan window is darker than a center region, may occur, thus degrading scanning performance due to a brightness difference in a target surface for scanning. Since a relatively small amount of light is delivered to the edge region of an image compared to the center region, the image may be recognized to be dark.

Figure 1:
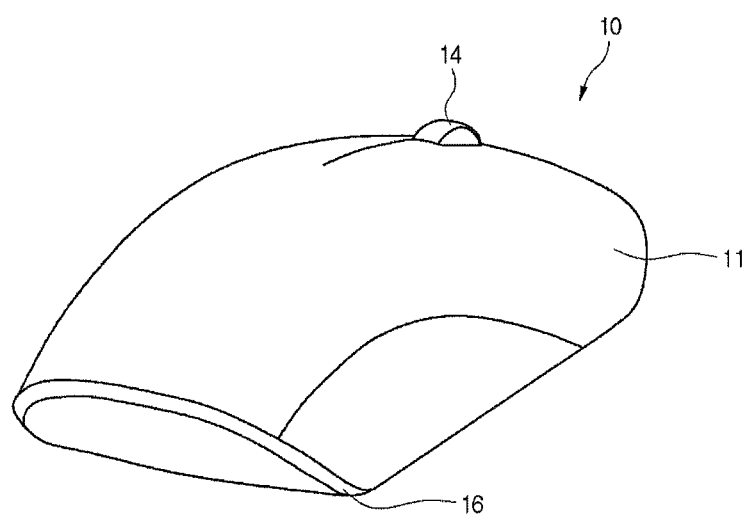
FIG. 1 is a perspective view of a mouse having a scanning function, according to an embodiment as broadly described herein.
Figure 2:
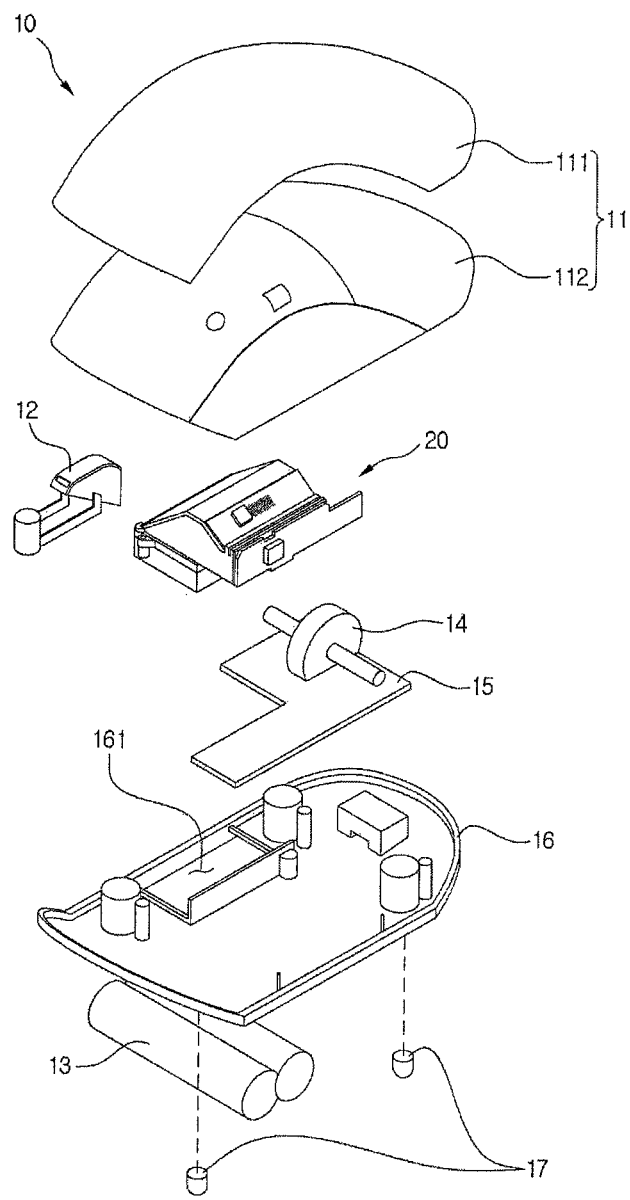
FIG. 2 is an exploded perspective view of the mouse shown in FIG. 1.

FIG. 1 is a perspective view of a mouse having a scanning function, and FIG. 2 is an exploded perspective view of the mouse shown in FIG. 1, according to an embodiment as broadly described herein.

Referring to FIGS. 1 and 2, a mouse 10 as embodied and broadly described herein may include a case forming an appearance thereof, and a plurality of elements installed inside the case.

In detail, the case may include a base 16 having a transmission window 161, and a cover 11 coupled to an upper surface of the base 16. The cover 11 may include an upper cover 111 and a lower cover 112. Alternatively, the cover 11 may include an upper cover, a middle cover, and a lower cover.

The mouse 10 may also include a main board 15 mounted on an upper surface of the base 16, a scanner 20 mounted in a region of the transmission window 161, a scroller 14 at a front upper portion of the main board 15, a scan button 12 provided at one side of the cover 11 to receive an externally input scan command, and a mouse sensor 17 installed at each of a front end and a rear end of a bottom surface of the base 16. The mouse sensors 17 may be installed facing each other or facing diagonally at a center of the front side or a center of the rear side of the base 16. A battery 13 may supply power to a wireless communication module of the mouse.

The main board 15 may cover a bottom interior region of the base 16 except the transmission window 161. The scanner 20 may be mounted on the transmission window 161. A plurality of mouse sensors may be provided such that although movement of the mouse 10 is irregular, the mouse sensors 17 correctly recognize a scan object. In a case in which a single mouse sensor 17 is provided, when the mouse 10 is not linearly moved in left and right directions but is moved along a curved path, or is moved in left and right directions and is obliquely moved in up and down directions, the mouse sensor 17 may not sense such a movement. However, when at least two mouse sensors 17 are installed at positions facing each other, they may correctly recognize a two dimensional coordinate and thus correctly recognize a moving trace of the mouse 10. That is, although the mouse 10 is not moved in a horizontal direction (X-axis direction of a two dimensional coordinate) but is obliquely moved, or is moved along a curved path, the mouse sensors 17 may correctly scan an object without overlapping or distortion of a photographed scan image.

Figure 3:
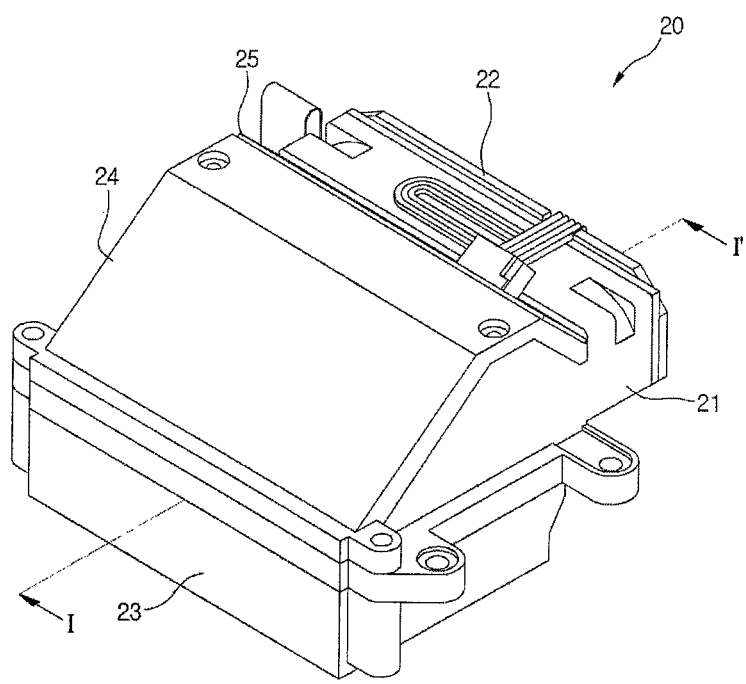
FIG. 3 is a perspective view of a scanner, according to an embodiment as broadly described herein.

Hereinafter, the scanner 20 provided in the mouse 10 will be described in detail with reference to the drawings. FIG. 3 is a perspective view of the scanner 20 according to an embodiment as broadly described herein, and FIG. 4 is an exploded perspective view of the scanner 20 shown in FIG. 3.

Figure 4:
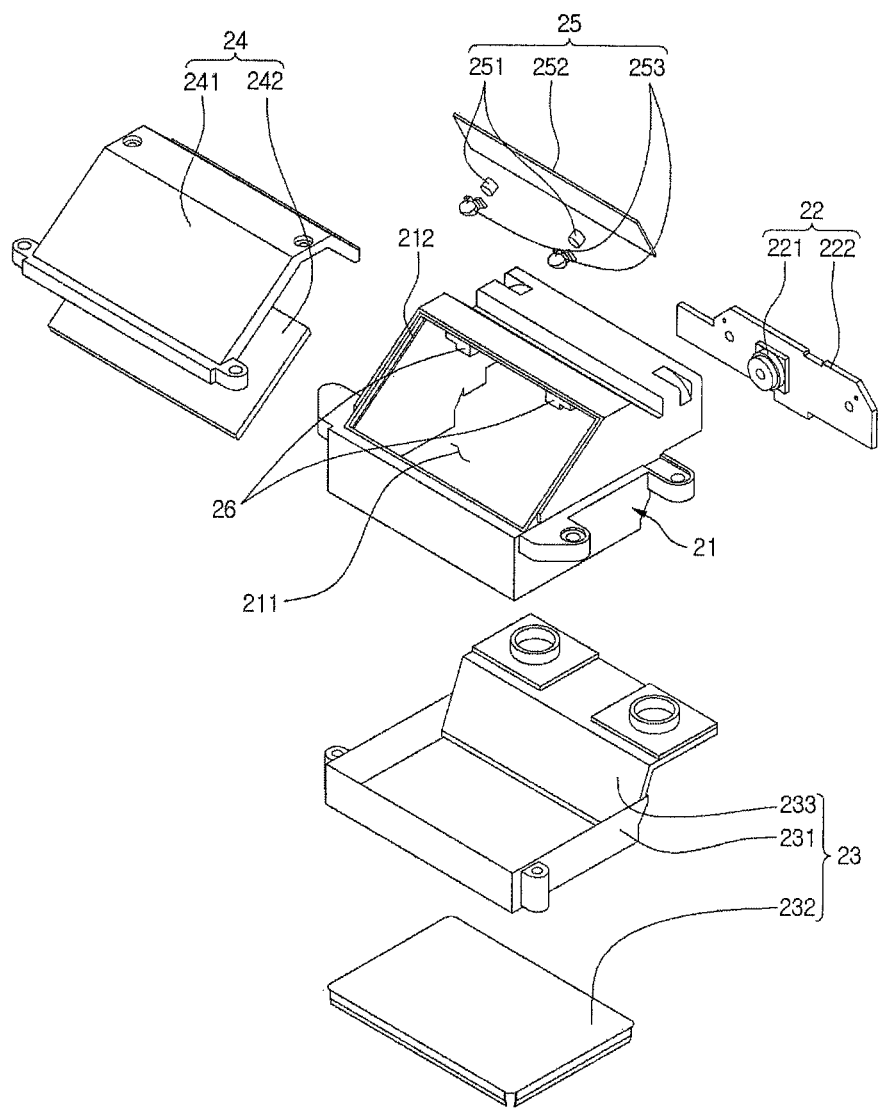
FIG. 4 is an exploded perspective view of the scanner shown in FIG. 3.

Referring to FIGS. 3 and 4, the scanner 20 may include a housing 21, a glass module 23 installed on a bottom of the housing 21, a mirror module 24 obliquely installed on a front side of the housing 21, a lighting module 25 obliquely installed on an upper surface of the housing 21, and a camera module 22 installed on a rear side of the housing 21.

The glass module 23 may include a glass frame 231 coupled to a lower side of the housing 21, and a transparent glass panel 232 installed on a bottom of the glass frame 231. The bottom of the glass frame 231 may have a rectangular frame shape with a hollow interior such that the glass panel 232 may be installed therein. A reflection layer 233 may be coated on an inner circumferential surface of the glass frame 231. The glass panel 232 may be installed on the bottom of the glass frame 231 or on the transmission window 161 of the base 16. However, the glass panel 232 may be installed on the bottom of the glass frame 231 so as to prevent dust or other foreign matter from being introduced into an inside of the scanner 20.

The reflection layer 233 may uniformly disperse light emitted from the lighting module 25 on the entire surface of the glass panel 232, and may be coated by, for example, a silk printing process or an optical printing process. The reflection layer 233 may prevent a phenomenon in which light is not uniformly delivered to an edge region of the glass panel 232, i.e., an edge region of the scanning region, and/or a phenomenon in which a relatively small amount of light is delivered to a side opposite the side at which light is irradiated from the lighting module 25. For this purpose, the lighting module 25 may be installed at a position where the field area of light which is diffused from the lighting module 25 and irradiated onto the glass panel 232 is larger than the area of the glass panel 232. Then, light deviated from the glass panel 232 may collide with the reflection layer 233 and may be again reflected toward the inside of the glass panel 232. The light which is irradiated from the lighting module 25 and is delivered to an outer region of the glass panel 232 may be reflected by the reflection layer 233 and irradiated toward an opposite side. Thus, since light is sufficiently irradiated to the region opposite that where light is irradiated from the light source, luminance may be uniform throughout the scan region.

A front surface of the housing 21 may be obliquely inclined, and a mirror hole 211 may be formed in the inclined front surface so that the mirror module 24 may be installed in the mirror hole 211. The mirror module 24 may be obliquely installed to reflect an image delivered from the glass panel 232 toward the camera module 22.

The mirror module 25 may be mounted on a stepped portion 212 formed along an edge of the mirror hole 211. The mirror module 25 may include a mirror 242 having a size corresponding to the mirror hole 211, and a supporter 241 supporting the mirror 242. The stepped portion 212 may be formed such that a front edge of the mirror 242 closely contacts the stepped portion 212 along a predetermined width so that a force is not applied only to a specific portion of the mirror 242. Since a uniform force is applied to an entire rear surface of the mirror 242 by the supporter 241, a phenomenon in which the mirror 242 is curved by a non-uniform compressive force may be prevented, and thus a scan image captured by the camera module 22 is not distorted.

The light irradiated from the lighting module 25 may be reflected multiple times on an inner space of the scanner 20, i.e., along an optical path. When light is irradiated from the lighting module 25 onto the mirror 242 or the glass panel 232 and then is projected onto the camera module 22 during such an operation, the ghost phenomenon in which an image of the lighting module 25 is formed on the camera module 22 may occur. The ghost phenomenon may indicate a phenomenon in which a light source is directly viewed on an upper surface of a glass and the image of the light source formed on the upper surface of the glass is also formed on the camera module 22. This may be referred to as a hot spot phenomenon in which an image of strong light emitted from a light source is directly formed on the camera module 22 and becomes white.

The scanner 20 as embodied and broadly described herein such that the above-described ghost phenomenon and/or hot spot phenomenon is avoided.

In detail, as shown in FIG. 4, a barrier 26 for preventing occurrence of the ghost phenomenon may protrude in the form of one or more ribs on an inner upper surface of the housing 21. The barrier 26 may include one or more ribs that protrude downwardly by a predetermined length from the inner upper surface of the housing 21. The barrier 26 may be disposed in front of a point where a light source 251 of the lighting module 25 is installed. The barrier 26 may have an "L" shaped cross-section in which one side of a rib having a rectangular shape is stepped, and blocks an image of light from being directly formed on the glass panel 232 and at the same time minimizes blocking of light, facilitating uniform light distribution.

The lighting module 25 may include a pair of light sources 251 mounted on a substrate 252, and a diffusion lens 253 covering an entire surface of each of the pair of light sources 251.

The light sources 251 may include an LED device and may be respectively installed on left and right portions of the substrate 252. The diffusion lenses 253 may be installed so as to increase a diffusion angle of light emitted from the light sources 251. The substrate 252 may be obliquely installed such that sufficient light is directed toward the glass panel 232. Since the light sources 251 are obliquely installed at points spaced laterally from an upper direction of the glass panel 232, a traveling distance of light emitted by the light sources 251 may increase compared with a case where the light sources are positioned just above the glass panel 232 and the volume of the mouse may be minimized. In addition, since the light sources 251 are disposed at points deviating from only the upper direction of the glass panel 232, occurrence of the ghost phenomenon or hot spot phenomenon in which an image of light irradiated from the light sources 251 is directly formed on the glass panel 232 may be prevented.

The camera module 22 may include a camera 221 photographing an image of a scanned object reflected by the mirror 242, and a substrate 222 on which the camera 222 is attached. The camera 221 may be installed on a side surface of the housing 21 corresponding to an opposite side of the mirror 242, with the camera 221 installed on a front surface of the substrate 222. Hence, the image of the scanned object under the glass panel 232 may be reflected by the mirror 242 and formed on an image sensor of the camera 221.

Hereinafter, functions of the barrier 26 for preventing movement of light and the ghost phenomenon occurring inside the scanner 20, i.e., on the light path, will be described with reference to the drawings.

Figure 5:
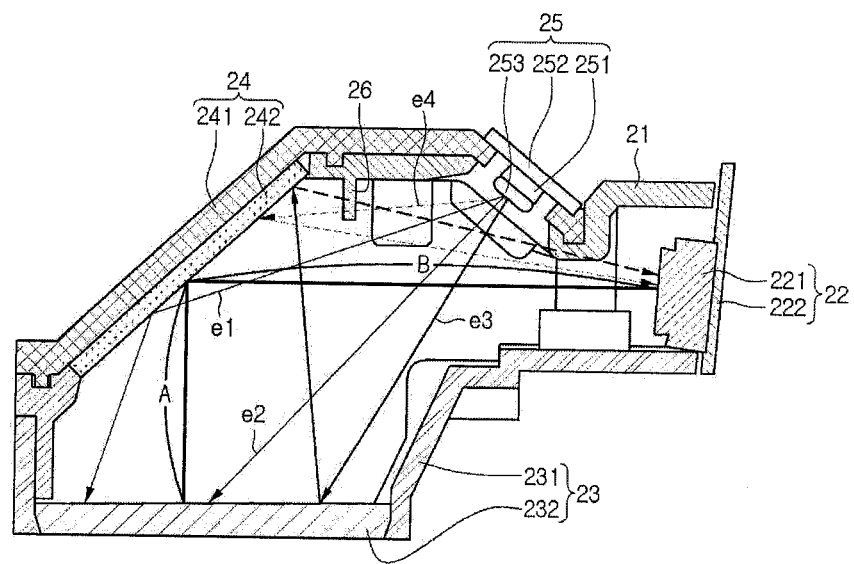
FIG. 5 is a cross-sectional view taken along line I-I of FIG. 3.
Figure 6:
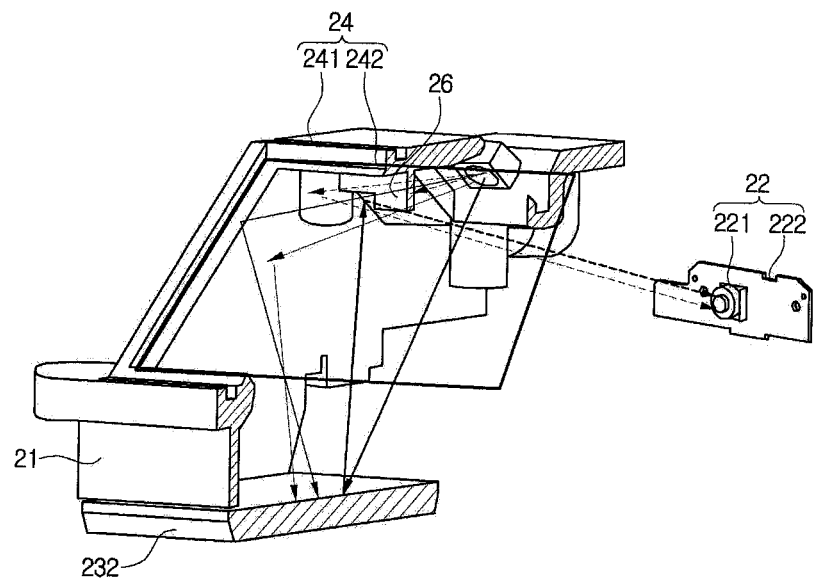
FIG. 6 is a cutaway perspective view taken along line I-I of FIG. 3.

FIG. 5 is a cross-section view taken along line I-I of FIG. 3, and FIG. 6 is a cutaway perspective view taken along line I-I of FIG. 3.

Referring to FIGS. 5 and 6, light emitted from the light sources 251 may be diffused while passing through the diffusion lenses 253, and thus may be mostly irradiated toward the glass 232.

That is, lights e1 and e2 respectively irradiated from the pair of light sources 251 directly collide with the glass panel 232 or are reflected by the mirror 242 and then delivered to the glass panel 232. The area of the light irradiated on the upper surface of the glass panel 232 from the light sources 251 may be larger than the area of the glass panel 232 due to the diffusion lenses 253. That is, a portion of the diffused light may also be irradiated on the reflection layer 233 by the diffusion lenses 253. The light irradiated on the reflection layer 233 may be reflected even to an edge region of the glass panel 232 to minimize a region appearing dark inside the glass panel 232, so that luminance may be uniformly maintained.

An inner circumferential surface of the housing 21 may be textured and an anti-reflection coating layer may be formed on the glass panel 232 and the mirror 242, so that a phenomenon in which the light colliding with the inner circumferential surface of the housing 21 or the light directly irradiated to the mirror 242 is again reflected and thus an image of the light is formed on the camera module 22 may be is prevented. Therefore, the occurrence of the ghost phenomenon in which light is murky and spread may be minimized.

Nevertheless, a portion of the light irradiated from the light sources 251 may be reflected on the mirror 242 and the glass panel 232 and delivered toward the camera module 22, so that there may be a possibility of occurrence of the ghost phenomenon. The barrier 26 is provided to preclude this possibility.

Light paths e3 and e4 marked as dotted lines in FIG. 5 may represent light paths causing the ghost phenomenon in the camera 221. Such a beam causing the ghost phenomenon may be blocked by the barrier 26 so that an image of the beam is prevented from being formed on the camera 221. Light passing through the stepped portion of the barrier 26 may allow luminance thereof to be uniform inside the housing 21.

The mouse scanner may conduct an image stitching operation, or an image merging operation, in which the mouse scanner moves in forward and backward and left and right directions to separately scan an object into a plurality of pieces and then merge the plurality of pieces to form a complete image that is the same as the original image of the object.

In detail, the image stitching operation may be conducted by an image stitching algorithm, with a minimum size of an image making it possible to conduct the image stitching.

For such an image stitching operation, coordinates corresponding to the motion of the mouse may be recognized using the two mouse sensors 17, and when a scan window, i.e., the transmission window 161 has a rectangular shape rather than a square shape, normal scanning for a curved motion may be possible. In other words, when the scan window has a square shape, it may be difficult to normally merge images photographed while the mouse travels a curved path. Therefore, a rectangular scan window having a longitudinal width greater than a lateral width thereof may provide for an image merging with high accuracy, particularly when the lateral width of the scan window is at least, for example, 15 mm and the longitudinal width is, for example, at least 40 mm. In the case of scan windows having lateral widths and longitudinal widths less than the above values, the image merging rate may be reduced.

Under such a premise, it has been confirmed the light path of the scan image set inside the scanner 20, i.e., a minimum value (a sum of path A and path B in FIG. 5) from the glass panel 232 to the mirror 242 may optimally be about 43.2 mm. When the light path is shorter than the minimum value, the size of a captured image decreases, and when the size of the captured image is too small, it may be difficult to conduct the image stitching. In addition, when the size of the scanner 20 is further decreased such that the light path is shorter than 43.2 mm, the light emitted from the light sources 251 is reflected toward the camera 221, so that the ghost phenomenon may be deteriorated. Therefore, the light path of 43.2 mm may be defined as the minimum distance for image stitching.

Figure 7:
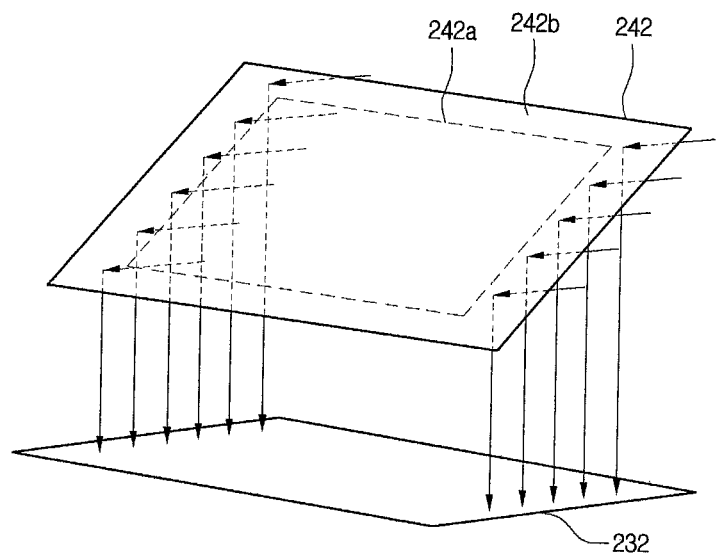
FIG. 7 is a view of a mirror and a glass of a scanner, according to an embodiment as broadly described herein.

FIG. 7 is a view showing a mirror and a glass panel of a scanner, according to an embodiment as broadly described herein.

Referring to FIG. 7, a reflection layer 233 may be formed inside the glass frame 231 of the glass module 23 of the scanner 20 to minimize a phenomenon in which an edge of a scan image is darkly photographed.

In addition, luminance uniformity may be increased by allowing the size of the mirror 242 to be larger than the area of the field of view 242a. In detail, in typical applications, the size of the mirror is substantially the same as the area of the field of view of the camera, and the mirror is used for converting the light path toward the camera. However, the area of the mirror 242 in accordance with embodiments as broadly described herein may be larger than the area of the field of view 242a of the camera 221, so that the light colliding with an edge region 242b of the mirror 242 corresponding to an outside of the field of view of the camera 221 is reflected toward the glass 232. By doing so, the luminance at an edge of the glass panel 232 may be sufficiently secured to prevent an edge of a scan image from being darkly photographed.

Hereinafter, a scanner according to another embodiment will be described in detail.

Figure 8:
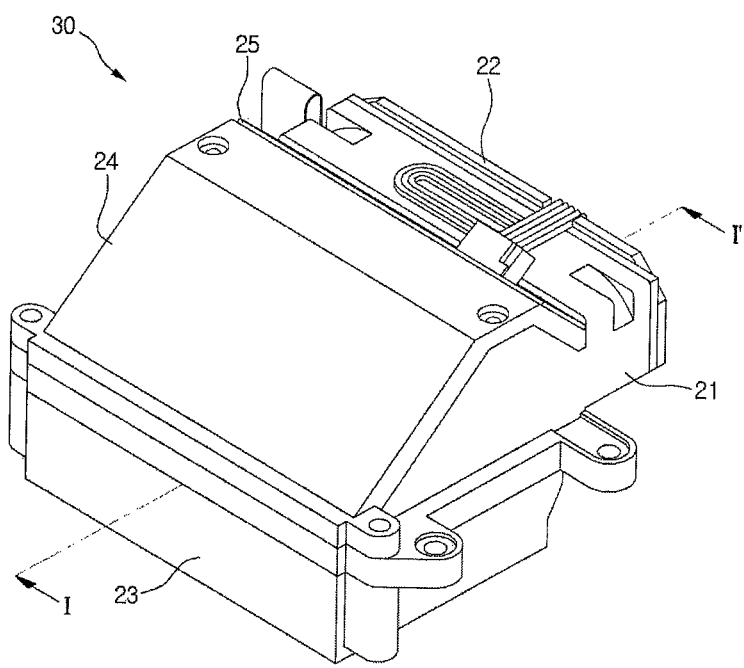
FIG. 8 is a perspective view of a scanner, according to another embodiment as broadly described herein.
Figure 9:
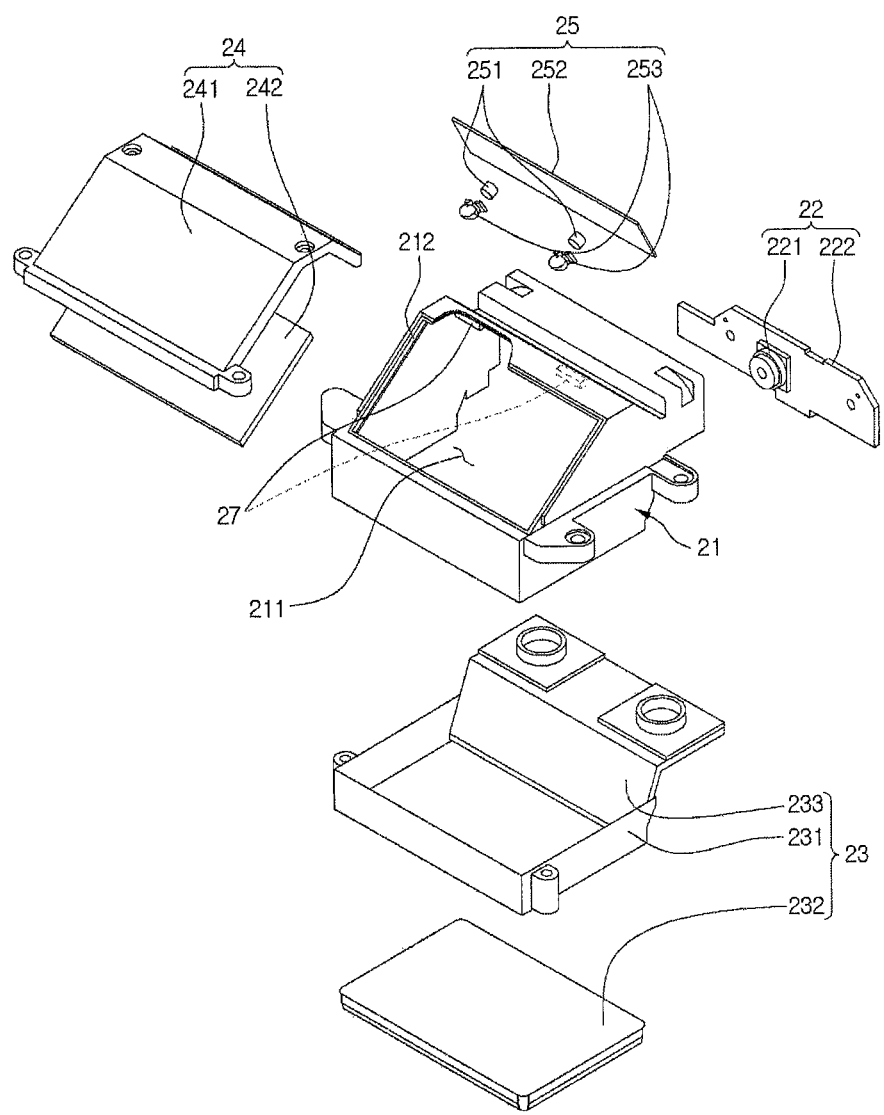
FIG. 9 is an exploded perspective view of the scanner shown in FIG. 8.
Figure 10:
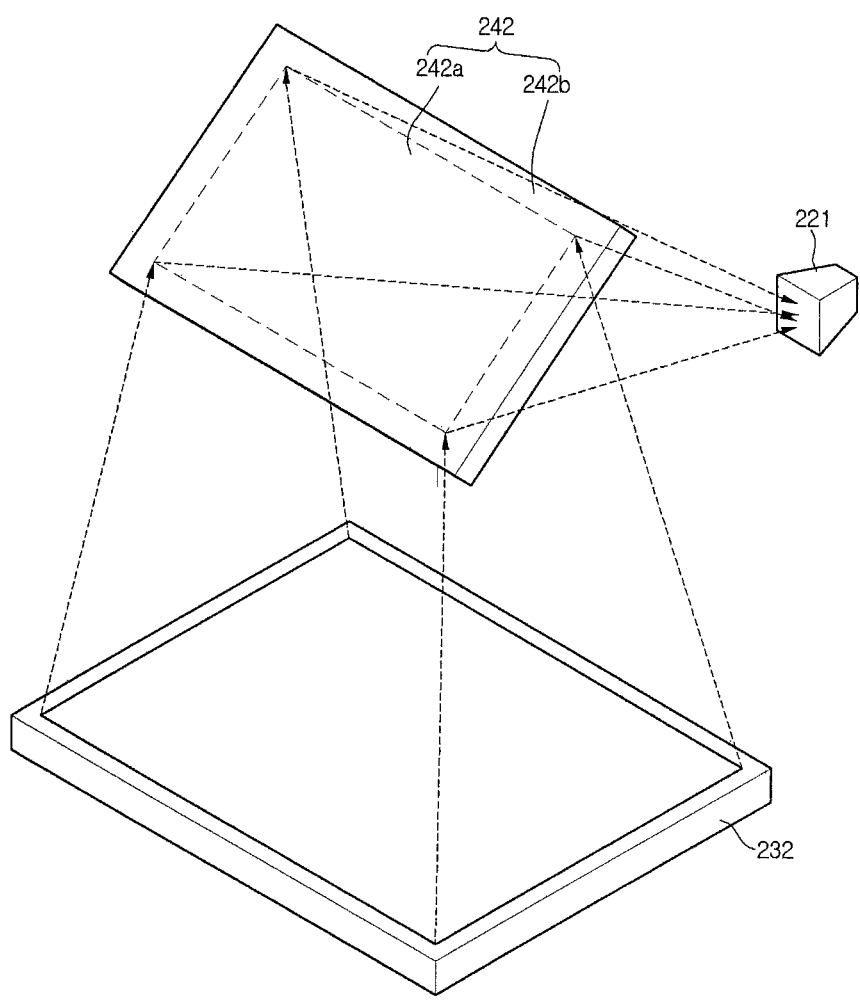
FIG. 10 is a light path view of a camera photographing region of a mouse scanner, according to another embodiment as broadly described herein.

FIG. 8 is a perspective view of a scanner according to another embodiment, FIG. 9 is an exploded perspective view of the scanner shown in FIG. 8, and FIG. 10 is a light path view showing a camera photographing region of the mouse scanner shown in FIGS. 8 and 9. Elements that are substantially the same as or similar to those in the previous embodiments are denoted by the same reference numerals and the repeated description thereof will be omitted.

Referring to FIGS. 8 and 9, a barrier 27 for preventing the ghost phenomenon may protrude in the form of one or more ribs from an inner upper surface of a housing 21 in a scanner 30. The barrier 27 may be provided in the form of one or more ribs that protrude downward by a predetermined length from the inner upper surface of the housing 21. The barrier 27 may be disposed in front of a point where a light source 251 of the lighting module 25 is installed.

Functions of the barrier 27 for preventing movement of light and the ghost phenomenon occurring inside the scanner 30, i.e., on the light path, will be described with reference to the drawings.

Referring to FIG. 10, an image reflected in the glass panel 232 is projected on the mirror 242, reflected by the mirror 242, and formed on the camera 221 of the scanner 30. As shown in FIG. 10, the field of view or the photographed region of the camera 221 may include a region that is smaller than the entire area of the mirror 242. That is, the field of view 242a may be formed on the mirror 242 and an edge region 242b outside the field of view 242a deviates from the field of view of the camera 221, but becomes a reflection region on which the light emitted from the light sources 251 is reflected.

Figure 11:
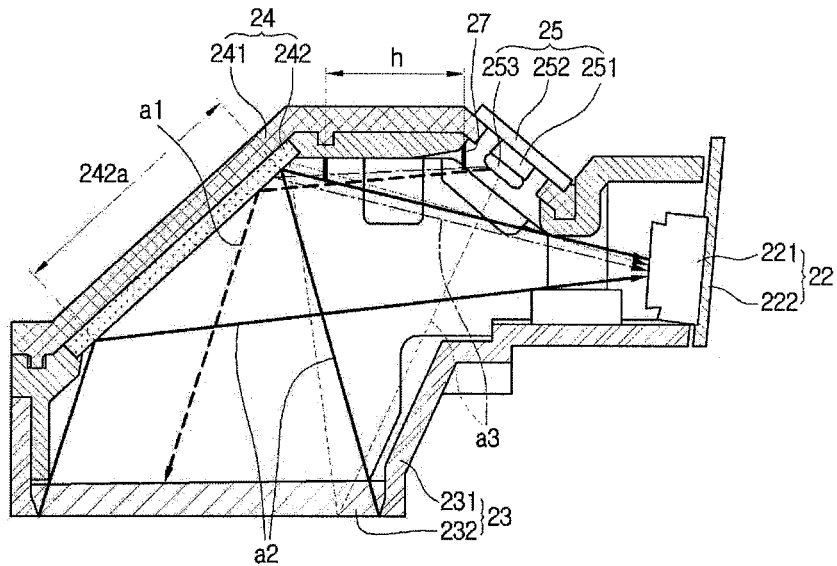
FIG. 11 is a cross-sectional view taken along line I-I of FIG. 8.
Figure 12:
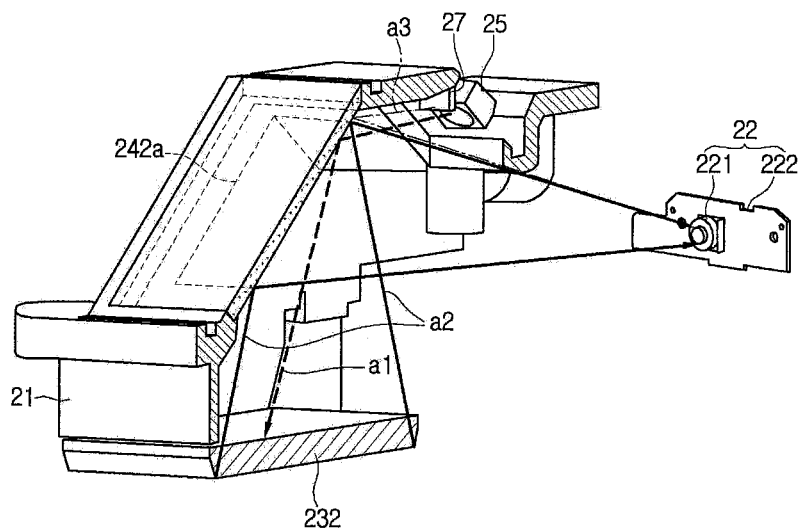
FIG. 12 is a cutaway perspective view taken along line I-I of FIG. 8.

FIG. 11 is a cross-section view taken along line I-I of FIG. 8, and FIG. 12 is a cutaway perspective view taken along line I-I of FIG. 8.

Referring to FIGS. 11 and 12, light emitted from the light sources 251 is diffused while passing through the diffusion lenses 253, and thus is mostly irradiated toward the glass panel 232.

In detail, as shown in FIG. 10, light path "a2" is a light path showing that an image of a scanned object viewed under the glass panel 232 is formed on the camera 221.

Also, light path "a1" is a travel path of light that is irradiated from the light sources 251, reflected on the mirror 242, and delivered to the glass panel 232 to illuminate the glass 242. The light reflected through the light path "a1" illuminates the glass panel 232 to light the image of the scanned object under the glass panel 232, but does not generate the ghost phenomenon.

The area of the light illuminated on the upper surface of the glass panel 232 from the light sources 251 is larger than the area of the glass panel 232 due to the diffusion lenses 253. That is, a portion of the diffused light is also illuminated on the reflection layer 233 by the diffusion lenses 253. The light illuminated on the reflection layer 233 is reflected even to an edge region of the glass panel 232 to minimize a region appearing dark inside the glass panel 232 so that luminance is uniformly maintained.

Also, since an inner circumferential surface of the housing 21 is textured and an anti-reflection coating layer for preventing glare caused by full reflection is formed on the glass panel 232 and the mirror 242, a phenomenon in which the light colliding with the inner circumferential surface of the housing 21 or the light directly illuminated to the mirror 242 is again reflected and thus an image of the light is formed on the camera 22 is minimized. Therefore, the occurrence of the ghost phenomenon in which light is murky and spread may be minimized.

Nevertheless, some portion of the light irradiated from the light sources 251 may be reflected on the mirror 242 and the glass panel 232 and delivered toward the camera module 22, so that the ghost phenomenon may occur under some circumstances. The barrier 27 may preclude this from occurring.

Light path "a3" is a light path causing the ghost phenomenon in the camera 221. While it is expressed that any of the light paths has an incidence angle incident into the mirror 242 and a reflection angle reflected by the mirror 242 that are different from each other, a case in which the light emitted from the light sources 251 collides with the mirror 242 and then an image of the light is directly formed on the camera 221 may occur in a three-dimensional space inside an actual scanner. Such a beam causing the ghost phenomenon may be blocked by the barrier 27 so that an image of the beam is prevented from being formed on the camera 221.

The barrier 27 may be provided in the form of a rectangular rib protruding downward from an inner upper surface of the housing 231. As a position of the barrier 27 approaches the light source 251 and moves away from the mirror 242, properties may be improved. In detail, in the case in which the barrier 27 is installed close to the mirror 242 or enters within the field of view of the camera 221 due to the height thereof, i.e., the protruded length being too great, a phenomenon in which a shadow of the barrier 27 is blurred on the camera 221 may occur. This blurred shadow is unnecessarily scanned, so that a letter or image of a scanned object is not clearly seen. To prevent such a phenomenon from occurring, the location and height of the barrier 27 may be set as appropriate.

That is, to prevent the shadow of the barrier 27 from being formed on the camera 221, the barrier 27 allows as much normal illumination to light the glass panel 232 as possible without causing the ghost phenomenon from the light emitted from the light sources 251, while at the same time blocking the light causing the hot spot as much as possible. The barrier 27 may be also positioned outside the viewing angle of the camera 221 so that the image of the barrier 27 is not directly formed on the camera 221.

Therefore, as shown in the drawings, the barrier 27 may be installed at a predetermined height at a point between the light sources 251 and the mirror 242, and the closer the barrier 27 is to the mirror 242, the further the barrier 27 extends downward, with a lower end of the barrier 27 be positioned outside the viewing angle of the camera 221.

In addition, the barrier 27 may be installed at a point closest to the light sources 251, and may be formed at a height capable of blocking a hot spot-causing light that is emitted from the light sources 251, reflected on the mirror 242 and is directly formed on the camera 221.

Figure 13:
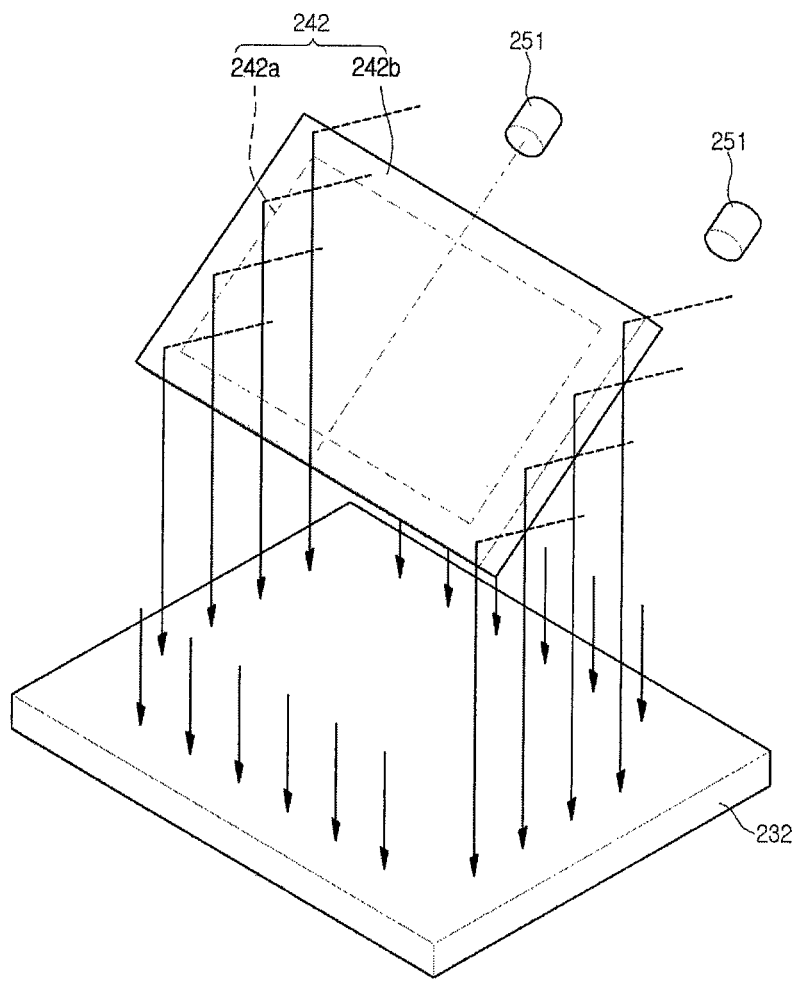
FIG. 13 is a view of a mirror and a glass of a scanner, according to another embodiment as broadly described herein.

FIG. 13 is a view of a mirror and a glass panel of a scanner according to another embodiment.

As noted above, a reflective layer 233 may be formed inside a glass frame 231 of a glass module 23 of a scanner 30 to minimize a phenomenon in which an edge of a scan image is darkly photographed.

In addition, luminance uniformity may be increased by allowing the size of the mirror 242 to be larger than the area of the field of view 242a. In detail, in a typical scanner the size of the mirror is substantially the same as the area of the field of view of the camera, and the mirror is used for converting the light path toward the camera. However, the area of the mirror 242 shown in FIG. 13 is larger than the area of the field of view 242a of the camera 221, so that the light colliding with an edge region 242b of the mirror 242 corresponding to an outside of the field of view of the camera 221 is reflected toward the glass panel 232. By doing so, the luminance at an edge of the glass panel 232 may be sufficiently secured to prevent an edge of a scan image from being darkly photographed.

In a mouse having a scanning function, as embodied and broadly described herein, since the light source is installed at a point spaced apart from a photographing region of the camera, a phenomenon in which the light source is scanned together may be prevented.

In a mouse having a scanning function, as embodied and broadly described herein, since the light source is installed at a point sufficiently spaced from the scan window and a reflection layer for light diffusion is coated on an inner side region of the scan window, light may be uniformly irradiated on the scan region and thus luminance may be uniformly maintained.

In a mouse having a scanning function, as embodied and broadly described herein, since the camera is installed in an inner side region of the mouse, the overall volume of the mouse may be reduced, thus enhancing user grip sensitivity.

In a mouse having a scanning function, as embodied and broadly described herein, the reflection layer for light diffusion may diffuse light emitted from the light source causing the use rate of light to increase, so that an effective light intensity may be obtained by a small number of light sources.

Since light is uniformly diffused by the reflection layer, a ghost phenomenon occurring when light is concentrated on a specific region and thus reflected toward the camera may be prevented.

In a mouse having a scanning function, as embodied and broadly described herein, since a diffusion lens for light diffusion is provided on an entire surface of the light source to increase the diffusion area of light and allow light to be uniformly irradiated on a scan region, an effective light intensity may be obtained by a small number of light sources.

In a mouse having a scanning function, as embodied and broadly described herein, since a ghost barrier is installed around the light source, light irradiated from the light source may be directly formed on a glass and thus occurrence of the ghost phenomenon may be prevented.

In a mouse having a scanning function, as embodied and broadly described herein, since the area of the mirror is wider than the area of the field of view such that light is again reflected to the glass colliding with an edge of the mirror, a phenomenon in which a boundary surface of an image becomes dark may be minimized.

In one embodiment, a mouse having a scanning function, as embodied and broadly described herein, may include a base having a scan window; a cover member coupled to an upper surface of the base; a scan button provided on one sided surface of the case; a scanner received within the case and mounted on the scan window, wherein the scanner includes: a housing forming a light path therein; a glass module installed in a lower side of the housing and coupled to the scan window; a mirror module installed in one sided portion of an upper side of the housing to reflect a scan image delivered from the glass module; a camera module installed at a side portion of the housing corresponding to an opposite side of the mirror module to photograph an image reflected by the mirror module; a lighting module installed in an inner upper side of the housing spaced apart from the camera module; and a barrier disposed in an inner upper side of the housing corresponding to a front side of the lighting module to block light reflected from an inside of the housing and formed on the camera module.

The lighting module may include a pair of LED light sources, and the barrier may be provided in a portion in front of each of the LED light sources.

The barrier may have a lower end portion of which a portion is stepped lower than another portion The mirror module may include a mirror reflecting light and the mirror may be obliquely installed in the housing to reflect the scan image delivered from the glass module toward the camera module.

The mirror module may be formed larger than the field of view of the camera module such that the light delivered to an edge of the mirror corresponding to a portion outside the field of view of the camera module may be reflected toward the glass module.

A sum of a first light path from the glass module to the mirror module and a second light path from the mirror module to the camera module may be about 43.2 mm.

The glass module may include a transparent glass and a glass frame having a lower surface on which the glass is installed, and a reflection layer may be formed on an inner circumferential surface of the glass frame.

The mouse may further include an anti-reflection coating layer coated on the glass.

The mouse may further include an anti-reflection coating layer coated on the mirror.

The barrier may extend from a point between the camera module and the mirror toward a bottom of the housing, and an extending end of the barrier may be placed outside the field of view of the camera module.

The lighting module may include a pair of LED light sources, and the barrier may be provided on a portion in front of the LED light sources.

The mirror module may include a mirror reflecting light, and the mirror may be obliquely installed to reflect the scan image delivered from the glass module toward the camera module.

The mirror may be formed larger than the field of view of the camera module such that the light delivered to an edge of the mirror corresponding to a portion outside the field of view of the camera module may be reflected toward the glass module.

The glass module may include a transparent glass and a glass frame having a lower surface on which the glass is installed, and a reflection layer formed by a silk printing or an optical printing may be disposed on an inner circumferential surface of the glass frame.

An anti-reflection coating layer preventing glare may be formed on the glass.

An anti-reflection coating layer preventing glare may be formed on the mirror.

The light source may be installed inclined by a predetermined angle from a horizontal line to a lower side to be oriented toward the glass.

The barrier may be formed at a point closer to the light source than the mirror.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A mouse having a scanning function, comprising:
a case including a base having a scan window, and a cover coupled to the base; and
a scanner received within the case and mounted on the base, the scanner provided at a position corresponding to the scan window, wherein the scanner comprises:
a housing;
a glass panel coupled to a lower portion of the housing, the glass panel being coupled to the scan window;
a mirror unit provided at a first end of an upper portion of the housing, wherein the mirror unit is configured to reflect a scan image received from the glass panel;
a camera unit provided at a second end of the upper portion of the housing, the first end being opposite of the second end at which the mirror unit is provided, wherein the camera unit is configured to capture an image reflected by the mirror unit;

a lighting unit installed at the upper portion of the housing, the lighting unit being spaced apart from the camera unit; and a barrier provided at an inner surface of the upper portion of the housing, at a position corresponding to an emitting side of the lighting unit, the barrier blocking light reflected from an inside of the housing from being reflected onto the camera unit.

2. The mouse according to claim 1, wherein the lighting unit comprises a pair of light emitting diode (LED) light sources, and a corresponding portion of the barrier is respectively provided in front of each of the pair of LED light sources.

3. The mouse according to claim 2, wherein the barrier extends downward from the inner surface of the upper portion of the housing into the inside of the housing, wherein the barrier is stepped such that a first portion of the barrier extends further down into the inside of the housing than a second portion of the barrier.

4. The mouse according to claim 1, wherein the mirror unit comprises a mirror configured to reflect light, wherein the mirror is coupled to the housing at an incline so as to reflect the scan image received from the glass panel toward the camera unit.

5. The mouse according to claim 4, wherein an area of the mirror is greater than a field of view of the camera unit such that light transmitted to a peripheral portion of the mirror corresponding to an area outside the field of view of the camera unit is reflected toward the glass panel.

6. The mouse according to claim 4, further comprising an anti-reflection coating layer coated on the mirror.

7. The mouse according to claim 1, wherein a sum of a first light path from the glass panel to the mirror unit and a second light path from the mirror unit to the camera unit is about 43.2 mm.

8. The mouse according to claim 1, wherein the glass panel comprises:
a glass frame;
a transparent glass panel installed on a lower surface of the glass frame; and
a reflection layer formed on an inner peripheral surface of the glass frame.

9. The mouse according to claim 8, further comprising an anti-reflection coating layer coated on the glass panel.

10. The mouse according to claim 1, wherein the barrier extends from a point on the inner surface of the upper portion of the housing that is between the camera unit and the mirror unit toward a bottom of the housing, with outside ends of the barrier positioned outside a field of view of the camera unit.

11. The mouse according to claim 10, wherein the lighting unit comprises a pair of light emitting diode (LED) light sources, and a corresponding portion of the barrier is respectively provided in front of each of the pair of LED light sources.

12. The mouse according to claim 10, wherein the mirror unit comprises a mirror configured to reflect light, and wherein the mirror is coupled to the upper portion of the housing at an incline so as to reflect the scan image received from the glass panel toward the camera unit.

13. The mouse according to claim 12, wherein an area of the mirror is greater than the field of view of the camera unit such that light transmitted to a peripheral portion of the mirror corresponding to an area outside the field of view of the camera unit is reflected toward the glass panel.

14. The mouse according to claim 13, further comprising an anti-reflection coating layer provided on the mirror unit to prevent glare.

15. The mouse according to claim 10, wherein the glass panel comprises:
a glass frame;
a transparent glass panel installed on a lower surface of the glass frame; and
a reflection layer formed on an inner peripheral surface of the glass frame, wherein the reflection layer is a silk printed layer or an optical printed layer.

16. The mouse according to claim 15, further comprising an anti-reflection coating layer provided on the glass panel to prevent glare.

17. The mouse according to claim 10, wherein the lighting unit is installed in the housing a predetermined angle such that a plurality of lighting sources of lighting unit are oriented toward the glass panel.

18. The mouse according to claim 10, wherein the barrier is formed at a point on the inner surface of the upper portion of the housing that is closer to the lighting unit than to the mirror unit.

19. A mouse, comprising:
a base;
a cover coupled to an upper portion of the base; and
a scanner coupled to the base and covered by the cover, and positioned corresponding to a scan window provided in the base, wherein the scanner comprises:
a housing;
a glass panel coupled to a bottom of the housing, the glass panel including a glass panel defining a bottom surface of the scanner;
a mirror unit provided at a first end of a top of the housing, and positioned at a first inclination with respect to the glass panel;
a camera unit provided at a second end of the top of the housing, opposite the first end thereof, so as to face the mirror unit;
a lighting unit provided in the top of the housing, between the mirror unit and the camera unit, and positioned at a second inclination with respect to the glass panel, the second inclination being different from the first inclination; and
a barrier provided on an inner surface of the top of the housing, the barrier provided between the mirror unit and the lighting unit.

20. The mouse of claim 19, wherein the mirror unit comprises a mirror that is positioned at the first inclination so as to reflect a scan image received from the glass panel toward the camera unit, wherein an area of the mirror is greater than a field of view of a camera of the camera unit such that light transmitted to a peripheral portion of the mirror corresponding to an area outside the field of view of the camera is reflected toward the glass panel of the glass panel.

21. The mouse of claim 20, wherein the barrier comprises a pair of stepped ribs extending downward from the inner surface of the top of the housing, positioned corresponding to a pair of light emitting diode (LED) light sources of the light unit, with a first portion of each of the pair of stepped ribs extending further downward into the housing than a second portion thereof, and with outside ends of each of the pair of stepped ribs positioned outside the field of view of the camera.

* * * * *